United States Patent Office 2,801,538
Patented Aug. 6, 1957

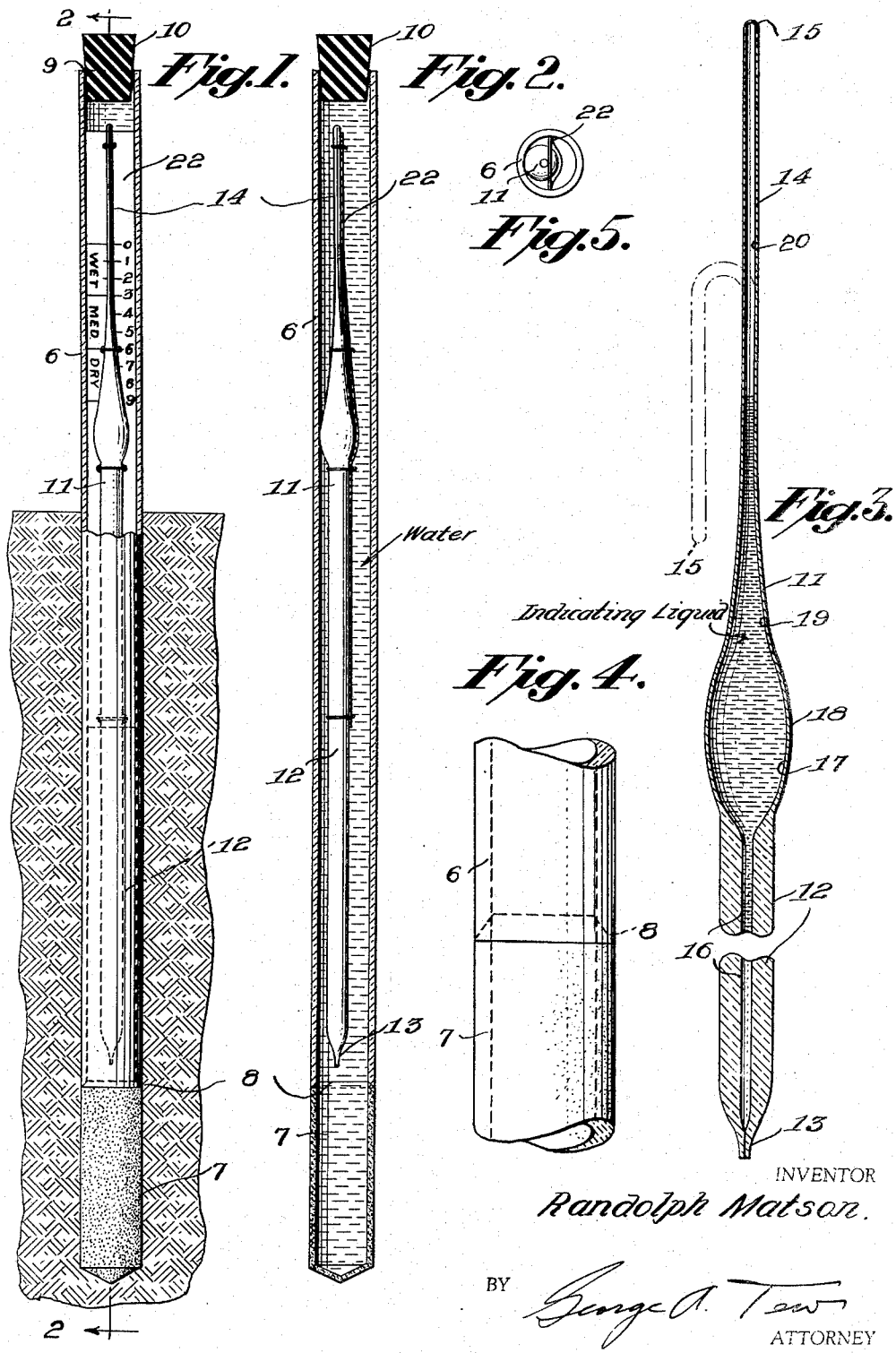

2,801,538

SOIL MOISTURE INDICATING GAGE

Randolph Matson, Vista, Calif.

Application July 6, 1954, Serial No. 441,259

2 Claims. (Cl. 73—73)

This invention relates to a soil moisture measuring and indicating device and more particularly to such a device which is adapted to be placed within the ground adjacent to the roots of plants or the like, and thereby indicate the moisture content of the soil adjacent to said roots.

The main object of the invention is to provide a soil moisture gage including an outer clear tubing having a porous cup attached to the bottom thereof, the outer tube containing within the same a clear indicating tube of varying bore containing a specific quantity of gas sealed in one end, the volume of which controls the position of a column of dyed indicating liquid. Attached to the indicating tube is a reading scale calibrated in soil moisture. The gage also includes a stopper for the open end of the outer tube whereby air is excluded from the interior thereof.

The moisture content of the soil controls the movement of water into or out of the porous cup, which in turn varies the volume of gas trapped in the indicating tube. The resulting position of the termination of the indicating column may be read as soil moisture on the adjacent scale.

A further object of the invention is to provide such a gaging device which can be inserted and removed from the ground adjacent to the roots of the plants or flowers if and when desired, it being contemplated that a plurality of such gages will be spaced with respect to a predetermined plot.

A further important object of the invention is to provide such a soil moisture gage in which the outside tubing is completely filled with water, air being excluded therefrom as by a rubber stopper positioned in the open end of the tube, the lower end of the tube having sealed thereto a porous ceramic cup or cap through which water within the gage, when conditions determine, will pass outwardly into the soil and conversely, when the reverse conditions exist, moisture from without the cup will pass therethrough into the interior of the ceramic cup, such action producing a change of pressure within the tube which is transmitted through the tail or lower end of the indicating tube through the indicating liquid, causing a change of volume of the gas sealed in the indicating tube and therefore a change in the position of the termination of the indicating column.

Other objects and advantages will be apparent from the following description, taken in connection with the accompanying drawings, and it is to be understood that the disclosed construction is one preferred embodiment of the invention and is capable of various modifications.

In the drawings in which like numerals indicate similar parts throughout the various views:

Fig. 1 is a view in front elevation, showing the gage mounted within a recess within the ground;

Fig. 2 is a vertical section on the line 2—2 of Fig. 1;

Fig. 3 is an enlarged view of the indicating tube removed from the outer gage tubing, showing the upper end of the tube in two of its capable positions and shown in longitudinal section;

Fig. 4 shows the method of joining the plastic tubing and the ceramic cup; and

Fig. 5 is a top plan view with the stopper removed.

Referring more specifically to the drawings, the main or outer tube of the gage is shown at 6 and comprises preferably a clear plastic tubing, said tube having a porous ceramic cup 7 of the same diameter sealed at a joint 8 to the tube 6. The tube is provided with an open end 9 which is closed by a rubber or other type stopper 10. Within the tube and extending longitudinally thereof is the indicating tube 11 which consists of a lower or tail portion 12 terminating at its end in a reduced portion 13. The indicator tube further has an upper end 14 which is sealed at its outermost end as at 15 and it will be obvious that the upper end of the tube may be left straight or bent, in the latter position being turned over for purposes of reducing the overall length of the gage. The indicator tube from its lower tapered end 13 is provided with a small capillary longitudinal bore 16 which extends upwardly through the tube and extends into and is flared to form a somewhat tear-shaped recess or portion 17, said tear-shaped body extending outwardly to its greater width at 18 and gradually tapering upwardly as indicated at 19 to finally terminate in a small capillary bore 20. It will, of course, be understood that the tear-shaped and tapered portion of the indicator tube contains a colored liquid, such as a colored oil, which has been found to be very useful in such a gage because it is lighter and does not mix with the water in the tube. The upper end of the capillary tube 14 is sealed at 15 to thereby trap the air or other gas in the tube 14 above the colored liquid.

Since the volume of the gas trapped in this manner will vary in accordance with Boyle's law (the volume of a given mass of gas kept at a uniform temperature varies inversely with the pressure), the column of indicating fluid will lower when the pressure within the gage is reduced below the normal atmospheric pressure. The bore of the indicating tube is tapered so that the increasing volume will cause the column to change approximately equal increments for each increment of pressure difference throughout the range of the device.

In its assembled condition the indicator tube is provided adjacent the rear side thereof with a thin strip of plastic material 22, said strip having impressed thereon at proper points, "dry;" "med." and "wet" on one side of the column thereof and on the adjacent side thereof is provided with a plurality of figures reading from 0 to 9.

As is clearly indicated in Figs. 2 and 5, the indicator tube 11 is secured radially of and to one side of the flexible plastic strip 22 as by means of twisted wires or the like 23, and as clearly indicated more particularly in Fig. 5 the strip 22 is of a width substantially equal to the internal diameter of the tube 6. The indicator tube 11 and the strip 22 are insertable as a unit into the tube 6 and upon such insertion the tear-shaped body 18 of tube 11 engages the inner wall of tube 6 with resulting lateral pressure on strip 22 whose opposite edges contact the inner wall of tube 6 whereby the combined tube 11 and strip 22 are frictionally retained within tube 6 as is clearly shown in Fig. 5.

It is of course necessary that the tube 11 and strip 22 be restrained against axial movement within the tube 6, since otherwise the indicia on the strip 22 might fall below the soil line.

As heretofore pointed out the gage is first assembled by inserting the indicator tube within the instrument as outlined above, after which with the instrument held in a vertical position and the rubber stopper 10 removed, the tube 6 is completely filled with water. As the pressure decreases inside the tube 6 as a result of the water passing out of the porous cup 7, bubbles of air trapped in various portions of the instrument will become larger and rise to the top of the fluid. It will then become necessary to remove the stopper 10 and add water to the tube 6 to completely fill the same. Quicker and more accurate readings are obtained when a minimum of air is present in tube 6.

It is considered from the above disclosure that the operation of the gage will be readily apparent by those skilled in the art, but in order to convey a clear understanding of the operation of the gage it can be said that after the indicator tube is mounted in the tube 6 and the same is filled with water as above pointed out, the ground in which the gage is to be used, which of course is preferably adjacent to the roots of plants or flowers, is prepared with a hole the size of the gage as by forming such an opening with a hole digger, such as a heavy spike or soil auger, after which the instrument which was used to create the hole is removed and the gage is dropped into position to a depth wherein the ceramic cup will be in the vicinity of the roots of the plants or flowers. In this position the instrument is left to stand for a considerable length of time and in consequence of the soil drying out adjacent to the porous cup, water from within the gage will be drawn by capillary action through the porous wall thereof into the adjacent capillary spaces in the soil. When such a condition occurs the pressure within the tube is thereby reduced and consequently the dyed liquid will move down the bore 16 and in so doing the upper level of the liquid will likewise move downwardly and thereby give an indication of the moisture in the soil adjacent to the ceramic cup as by the reading of the scale behind the indicator tube. Now, assuming that the indicating liquid in the gage has moved downwardly and the moisture content of the soil is increased, then the moisture will seep through the cup to the interior of the tube thereby creating a pressure upon the liquid, that is, pressure will be created upon the water within the tube which pressure is transmitted through the water in the bore 16 to the indicating liquid which causes the same to rise and produce a reading on the scale adjacent to the indicator tube, indicating that the moisture in the soil has increased.

It will therefore readily be seen that the gage is very useful to gardners or the like to give them a proper indication as to when the roots of their plants need water, or have enough water and therefore need none, and thereby providing considerable saving on water dispensed to plants which heretofore has been more or less haphazardly done and was determined more or less by the outward appearance of the soil around the plant.

It will, of course, be understood that when the gage is inserted within the hole made in the ground to accommodate the same it will be desirable to pack dirt tightly around the point where the gage leaves the soil to prevent surface seepage of water from running down along the outside of the gage, for if this were permitted the reading of the gage would be inaccurate.

It will be readily understood that the gage can be made up in various desirable lengths to thereby make the same capable of use with various type plants or flowers with roots extending to different depths below the surface. From an inspection of the indicator on the gage it will be readily apparent to persons using the same when and when not to add water and of course the particular type of plant being watered and the water-holding capacity of the soil will have some consideration as to when water should or should not be added to the plant and in general it has been found that water should be added when the indicating liquid drops to a position between the Figures 3 and 6 which is a medium water content. However, if it be desirable that the roots of certain plants have more moisture than ordinary, water can be added thereto to maintain the indicating fluid in the "wet" indicating area and likewise if it is desired that the plants be grown in relatively dry soil the indicating liquid can be controlled within the confines of the "medium" to "dry" portion of the scale.

When the instrument is not being used and is stored away, it is of course desirable to remove all of the water therefrom and as will readily be seen the indicating liquid will continue to stay within the indicator tube due to the capillary or small size of the bore at either end of the column. When near atmospheric pressure the body of liquid will remain intact, since no air will leave the trapped air at 20 and no air will enter through 16. A column of water will be held in the tube 12 below the indicating fluid, having flowed in behind the indicating fluid as the latter moved toward 15 as a result of increasing pressure, it being desirable to exclude air that could conceivably enter the gas trapped at 14 and make the calibration inaccurate.

While the invention has been disclosed in one preferred embodiment, it is to be understood that the same is not to be limited thereto but is capable of modification and variation within the scope of the following claims.

I claim:

1. A soil moisture indicating gage comprising an outer transparent open ended tube of uniform external and internal diameter throughout its length and having a smooth inner wall, a porous cup of the same diameter as said tube and having its upper open end secured to the lower open end of the tube, a transparent indicating tube disposed within said outer tube including an upper cylindrical end portion having a relatively small axial capillary bore therein and having a closed upper end, a lower cylindrical end portion of substantially greater diameter than said upper cylindrical portion and having an axial capillary bore of substantially the same diameter as said first bore, the lower end of said last cylindrical end portion tapering downwardly and having a restricted orifice communicating with said last bore, said indicating tube further including an intermediate portion of generally tear-shaped external form and of substantially greater diameter than said lower cylindrical portion, said intermediate portion providing a relatively large internal chamber in communication with said first and second capillaries and whose wall gradually tapers radially inwardly into the wall of said upper cylindrical portion, an indicating liquid confined within the indicating tube with a volume of gas confined in the upper end thereof, a scale fixed to the indicating tube, the outer tube being filled with water and having a stopper for the upper end thereof, the water within the outer tube communicating with the restricted orifice at the lower end of the indicating tube, the indicating liquid and pressure differential created within the outer tube by ingress and egress of water through the wall of the porous cup moving the indicating liquid within the indicating tube in accordance with the change of volume of the water within the outer tube, the intermediate tapered tear-drop portion of the indicating tube causing equal increments of pressure to cause approximately equal increments of movement of the column of liquid within the indicating tube.

2. A soil moisture indicating gage comprising an outer transparent cylindrical tube having open upper and lower ends, a stopper for said upper end and a porous cup having its upper open end secured to the lower open end of the tube, said tube and cup adapted to be filled with water, an elongated flexible scale strip disposed within the upper end portion of said outer tube and being of a width substantially equal to the internal diameter of the outer tube, and a transparent indicating tube disposed medially of said strip along one side thereof and secured thereto, said indicating tube being disposed between said strip and an adjacent wall of said outer tube and having a closed upper end and a capillary bore in communication with said outer tube, said indicating tube having a radially enlarged portion intermediate its ends of such diameter that one side thereof engages the said adjacent wall of said outer tube and an opposite side thereof flexes said strip toward an opposite side of the outer tube whereby the flexible scale strip and indicating tube are frictionally retained in the outer tube.

References Cited in the file of this patent

UNITED STATES PATENTS

| | | |
|---|---|---|
| 20,848 | Grimes | July 6, 1858 |
| 1,960,923 | Ricker | May 29, 1934 |
| 2,023,490 | Richards | Dec. 10, 1935 |
| 2,660,890 | Fletcher | Dec. 1, 1953 |

FOREIGN PATENTS

| | | |
|---|---|---|
| 435,815 | Germany | Oct. 18, 1926 |
| 444,330 | Great Britain | Oct. 26, 1935 |